United States Patent [19]

Kneller et al.

[11] Patent Number: 5,085,794
[45] Date of Patent: Feb. 4, 1992

[54] OLIGOMER CONTAINING PHOSPHINATE COMPOSITIONS AND THEIR METHOD OF MANUFACTURE

[75] Inventors: James F. Kneller, LaGrange Park; Vytas Narutis, Riverside; Barbara E. Fair, Downers Grove; Donald A. Johnson, Batavia, all of Ill.

[73] Assignee: Nalco Chemical Company, Naperville, Ill.

[*] Notice: The portion of the term of this patent subsequent to May 28, 1908, has been disclaimed.

[21] Appl. No.: 514,444

[22] Filed: Apr. 25, 1990

[51] Int. Cl.$^5$ .................... C02F 5/10; C23F 11/10
[52] U.S. Cl. ...................... 252/82; 252/100; 252/181; 252/80; 210/700
[58] Field of Search ............... 252/180, 181, 175, 80, 252/81, 82; 210/699, 700, 701

[56] References Cited

U.S. PATENT DOCUMENTS 4,088,678  5/1978  Matt et al. ................. 252/180
5,010,577  5/1991  Pardue et al. ............... 210/699

*Primary Examiner*—Prince Willis, Jr.
*Assistant Examiner*—James M. Silbermann
*Attorney, Agent, or Firm*—John G. Premo; Robert A. Miller

[57] ABSTRACT

A phosphinate containing composition which has as its major ingredient more than 32 mole percent of a phosphinicosuccinic acid oligomer having the probable structural formula:

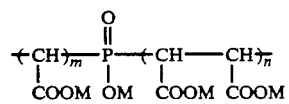

M is H, Na, K, NH$_4$, or mixtures thereof; and m and n are either 0 or a small whole number with the proviso that either m or n is a small whole number and the sum of m plus n is greater than 2.

3 Claims, No Drawings

OLIGOMER CONTAINING PHOSPHINATE COMPOSITIONS AND THEIR METHOD OF MANUFACTURE

INTRODUCTION

U.S. Pat. No. 4,088,678 discloses a method for the preparation of mono-sodium phosphinicobis(succinic acid). It also purporst to show this compound as possessing activity as a scale inhibitor. The same concepts are shown in more detail in its British counterpart, GB 1,512,440. The disclosures of these patents are incorporated herein by reference.

Both patents teach preparing its phosphinicobis (succinate) composition by reacting maleic acid with sodium hypophosphite in the presence of a water soluble initiator. The patents demonstrate that the optimum molar ratio of maleic acid to hypophosphite is 2.2. They clearly indicate that further excesses of the maleic acid do not result in an improved product.

The present invention is based on several discoveries which arose from duplicating the experimental work described in the U.S. and British patents. In the first instance, it was ascertained the products formed using a molar ratio of maleic acid: hypophosphite of 2.0 were, in fact, mixtures of products. An important discovery is that the active species that prevent scale formation are oligomers. Further, if the oligomeric species are not present in the compositions, there is poor scale inhibition or chelation. Finally, the invention is based on the discovery that the yield of oligomeric species can be improved by increasing the molar amount of the maleic acid used in the preparative procedure.

These discoveries, and their relation to the two patents, are more fully discussed hereafter. Also, the novel aspects of the invention in relation to the patents is specifically set forth at the end of the specification in the section entitled, "Novelty and Obviousness of the Invention".

THE PRIOR ART

In addition to U.S. Pat. No. 4,088,678 and its British counterpart, there exists other prior art which relates to the invention. In the presence of free-radical initiators, phosphorus compounds having at least one P-H linkage will react with unsaturated substrates to form various organo-phosphorus products. The nature of the product formed can be varied as a function of the number of reactive P-H bonds and stoichiometry of reagents, as referenced in:

Houben-Weyl, "Methoden der Organischen Chemie" 4th Ed., Vol. XII/1, Stuttgart, 1963, 228–229;

Bataafsche (Shell), "Process for the Production of Phosphorus-containing Organic Compounds and the Compounds so Produced", E.P. 660,918, 1949 [C.A. 46,8145 (1952)];

L. A. Hamilton, R. H. Williams, "Synthesis of Compounds Having a Carbon-Phosphorus Linkage", U.S. Pat. No. 2,957,931, (1960); and E. E. Nifant'ev, M. P. Koroteev, "Synthesis of Alkyl (Cycloalkyl) dichlorophosphines and their Conversion into Derivatives of Phosphinic Acids", J. Gen. Chem. (U.S.S.R.) 37,1293 (1967) [C.A. 68,39739b].

U.S. Pat. No. 2,724,718 also describes the preparation of organophosphorus compounds by reaction of olefinic substances with sodium hypophosphite or dialkyl phosphinates (HP (O) (OR)$_2$). Such reactions were conducted in alcohol in an autoclave at elevated temperatures (above 120° C.), employing free-radical initiators, such as peroxides.

The choice of initiator is not limited to peroxides and peroxyesters. Monoalkyl phosphinic acids (phosphonous acids) have also been prepared employing azo initiators, such as azobisisobutyronitrile, which is referenced in J. K. Thottathil's, "Process for Preparing Phosphonous Acids", EP App. 246,015 (1987). These reactions were conducted in alcoholic solution, maintaining acidic conditions.

In the case of activated olefins, hypophosphorous acid could be made to react in the absence of catalyst. By prolonged heating of hypophosphorous acid with diethyl maleate (1:1 molar ratio) in ethanol, 1,2-dicarboethoyxyethyl phosphinic acid was prepared, by A. N. Pudovik, T. M. Moshkina, I. V. Knovalova's, "New Method of Synthesis of Esters of Phosphinic and Thiophosphonic Acids. XXXI. Addition of Phosphorous and Hypophosphorous Acids, Dialkyl Hydrogen Phosphites and Esters of Phosphonoacetic Acid to Esters of Maleic Acid", Zh. Obshsch. Khim. 29, 3338 (1959) [C.A. 54,15223g].

M. G. Imaev, I. S. Akhmetzhanov, I. V. Tikunova, I. I. Lyubarskaya, V. V. Rozhkova, T. M. Alakasandrova, "Phosphinosuccinic Acid Monoester Disalts", U.S.S.R. 376,388 (1973) [C.A. 79,53557z] also describes the reaction of the monoalkyl ester of maleic acid in a similar fashion. Formation of the free succinic acid or related salts were not disclosed. Conversion of the intermediate ester to phosphinico (mono) succinic acid would require subsequent hydrolysis of the intermediate ester. This is a costly and time-consuming process.

Dialkylphosphinic acids are typically isolated in poor yield (9–40%) from the peroxide catalyzed addition of hypophosphorous acid to terminal olefins. The desired bisadduct could only be isolated by careful recrystallization of the product mixture, to separate this product from the monoalkylphosphinic acid. The preferred route was oxidation of di-n-alkylphosphine oxides, which is discussed in R. H. Williams and L. A. Hamilton's "Di-n-alkylphosphine Oxides. I. Synthesis", J. Am. Chem. Soc. 74:5418 (1952). These were prepared by Grignard reaction of magnesium alkyl halides (RMgX) with di-n-butyl phosphite.

Subsequent to the work described in U.S. Pat. No. 4,088,678, another patent, U.S. Pat. No. 4,445,983, describes the use of phosphinocarboxylic acids for sealing anodically produced oxide layers on aluminum and aluminum alloys. The materials were produced by reaction of hypophosphorous acid with unsaturated carboxylic acids, such as maleic, itaconic, and citraconic acids.

U.S. Pat. No. 4,590,014 describes an "improved" method for the formation of alkali metal phosphinate salts. The process involves simultaneous addition of olefinic material and peroxide catalyst to an aqueous alcoholic solution of alkali metal hypophosphite salt. The composition of the mixed water/alcohol solvent system was such that the reaction temperature could be conveniently maintained at or slightly above the decomposition temperature of the free-radical initiator. These conditions favor formation of the monoalkyl phosphinate over competing side-reactions such as telomerization, double bond polymerization, or oxidation of hypophosphorous acids. By this process, sodium phosphinosuccinic acid dimethyl ester was prepared by addition of dimethyl maleate and t-butyl peroctoate to a solution of sodium hypophosphite in ethanol/water (2/1) at 80° C. over 4.5 hours.

SUMMARY OF THE INVENTION

The invention comprises a predominantly phosphinate containing composition comprising:

| Ingredients | Mole Percent-Less Than |
|---|---|
| A. Monosodium phosphinicobis-(succinic acid) | 22 |
| B. Monosodium phosphinico-succinic acid | 26 |
| C. Sodium phosphonosuccinic acid | 12 |
| D. Sodium phosphate | 5 |
| E. Sodium phosphite | 6 |
| F. Sodium hypophosphite, and | 6 |
| G. A phosphinicosuccinic acid oligomer having the probable structural formula: | |

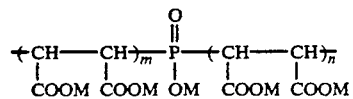

wherein G exceeds 32 mole percent, M is H, Na, K, $NH_4$, or mixtures thereof; and m and n are either 0 or a small whole number and the sum of m plus n is greater than 2.

In a preferred embodiment G is about between 35-40 mole percent. In most instances, M will be H, Na, and mixtures thereof.

As indicated, the above structure is considered to be probable, since due to the nature of the reactants, there is a possibility that a small amount would contain random phosphorous atoms in the chain. Also, it is known that compounds related to the above oligomer tend to decarboxylate in the presence of strong oxidizing agents such as peroxides, or at low pH. It has been demonstrated that such decarboxylation can be minimized by neutralization of the final product or decomposition of residual oxidant at production.

One of the most surprising discoveries upon which the invention is predicated is that the active chelant or scale inhibitor is the oligomer. As will be shown hereafter, when compositions are prepared without oligomer present, they possess poor scale inhibiting properties.

As previously stated, the improved scale inhibiting compositions afforded by the invention should contain more than 32 mole percent of the oligomer. Higher oligomer content, e.g. between 35-40 mole percent, gives the best scale inhibition results. The preferred method of making the compositions with high oligomer contents seems to be limited to producing materials having an oligomer content not much greater than 40 mole percent.

PREFERRED EMBODIMENTS OF THE INVENTION

In its broadest aspect, the method of making the compositions containing substantial quantities of oligomer comprises reacting a water soluble hypophosphite with and in the presence of an excess of maleic acid using a water soluble initiator at a temperature ranging between 50° C.-70° C. for a period of time ranging between four to eight hours with the molar ratio of maleic acid to water soluble hypophosphite being greater than 2.2, but less than 3.

Either hypophosphorous acid, alkali metal hypophosphites or other water soluble ammonium, alkali metal or amine hypophosphite salts may be used. By far the most preferred is sodium hypophosphite which is the most reactive yet, at the same time, is relatively inexpensive, and is readily available commercially.

The most preferred initiators are the water-soluble persulfates, particularly ammonium persulfate. It is possible to use other free-radical initiators such as the well known inorganic peroxides and hydroperoxides. Also useful are the so-called Vazo initiators as well as certain bisulfites. In any event, it is necessary that the initiator be water-soluble. The amount of the initiator ranges from as little as 0.1 up to as much as 10%. A preferred range is 7.5%. These percentages are based on the weight of the reactants.

The reaction time may vary from between two (2) to ten (10) hours with good results being achieved within the range of four (4) to eight (8) hours.

While maleic acid is the preferred material, maleic anhydride, the water-soluble maleate salts such as the alkali metal, ammonium, or amine salts, as well as certain maleate esters also may be used. It is understood that the term maleic acid when used herein and in the claims is intended to include these equivalents. It should be noted that the anhydride under the conditions of the reaction will hydrolyze to the acid.

As indicated, the moles of maleic acid to the hypophosphite should be greater than 2.2, but less than 3. In a preferred embodiment, it should be at least 2.3, but less than 3. In a most preferred embodiment, it should be 2.5, but less than 3.

The high oligomer containing products of the invention are only capable of being produced when the maleic acid is in excess to the hypophosphite during the course of the reaction. When the maleic acid is added to the hypophosphite simultaneously with the initiator, poor yields of the oligomer are obtained. The preparative technique set forth in U.S. Pat. No. 4,088,678 may be used. The compositions as produced are aqueous solutions containing between about 35-40 percent solids. To illustrate typical preparative techniques, the following are presented:

Maleic anhydride (306.25 g, 3.125 moles) briquettes were crushed and added to a 1.5 liter reaction flask along with about 516.9 g of water. The suspension was stirred for about fifteen (15) minutes as the maleic anhydride dissolved and hydrolyzed, raising the temperature of the solution from 21° C. to 32° C. After stirring for forty-five (45) minutes longer, the mild exotherm began to subside and sodium hypophosphite monohydrate (132.5 g, 1.25 moles) was added. A second mild exotherm occurred as sodium hyphophosphite dissolved. Nitrogen purging was begun and the reaction mixture was heated to 60° C. over thirty (30) minutes. Ammonium persulfate solution was added (99.75 g of a 37.22% aqueous solution) over about four hours. Temperature was controlled at 60° C.-61° C. using heating or cooling as needed. When addition of the catalyst was complete, heating at 60° C. was continued for two and one-half (2.5) hours longer. Heating was continued and incrementally increased to 80° C. until oxidant was consumed or destroyed, as indicated by a negative starch-iodide test. The clear, yellow solution was highly acidic (pH 1). The concentration of the final product before neutralization was 44.77% (assuming complete incorporation of maleic acid and sodium hypophosphite). Analysis of the reaction mixture was done using $^{31}P$ and $^{13}C$ NMR, showing the absence of maleic acid in the final product mixture.

A sample (100.0 g of the 44.77% solution described above) was neutralized to pH 7.0 by dropwise addition of the 50% sodium hydroxide. Temperature of the solution was observed and maintained at 60° C. or less with ice-water bath cooling. The concentration of the resultant solution was 30.79% (calculated based on dilution).

Using the above preparative technique, as well as what may be referred to as a semi-batch procedure, in which the maleic acid was added simultaneously with APS initiator, a variety of product compositions were prepared. The results of these preparations are set forth in Table I.

determined. By comparison of the observed soluble (filtered) calcium concentration with the theoretical concentration of calcium, an index of precipitation can be evaluated.

Two parameters are employed to characterize performance. The area of deviation between the theoretical and observed soluble calcium levels is integrated, as a measure of the total amount of precipitation. In addition, the maximum number of cycles which can be obtained before precipitation occurs characterizes inhibitor performance. A model has been developed to predict the potential $CaCO_3$ precipitation as a function of increasing concentration under the conditions of the test. The maximum $CaCO_3$ concentration where 95% of

TABLE I

REACTIONS OF SODIUM HYPOPHOSPHITE WITH MALEIC ACID AND MALEATES
$^{31}P$ NMR ANAL, Mole Percent Phosphorus Compound

| Sample Number | Mole Ratio Mal./Hypo | Procedure | 2:1 | OLIG | 1:1 | PSA | Other Phosphon | Resid. | Comments |
|---|---|---|---|---|---|---|---|---|---|
| 1 | 2.2:1 | Addn. of APS to M.A. & $NaH_2PO_2$ | 19.0 | 27.6 | 23.2 | 13.4 | 5.3 | 11.5 | |
| 2 | 2.2:1 | Addn. of APS to M.A. & $NaH_2PO_2$ | 18.6 | 26.2 | 37.4 | 6.2 | 2.0 | 9.6 | |
| 3 | 2.2:1 | Addn. of APS to M.A. & $NaH_2PO_2$ | 19.0 | 31.7 | 25.6 | 9.7 | 4.0 | 10.0 | |
| 4 | 2.2:1 | Addn. of APS to M.A. & $NaH_2PO_2$ | 21.9 | 32.9 | 25.9 | 8.9 | 3.6 | 6.8 | |
| 5 | 2.2:1 | Addn. of M.A. and APS to $NaH_2PO_2$ | 52.3 | 24.0 | 16.7 | 3.3 | 0.0 | 3.7 | |
| 6 | 2.0:1 | Addn. of M.A. and APS to $NaH_2PO_2$ | 49.6 | 15.1 | 31.0 | 1.5 | 1.0 | 2.8 | Unreacted M.A. in sample |
| 7 | 2.0:1 | Addn. of M.A. and APS to $NaH_2PO_2$ | 57.4 | 13.5 | 20.6 | 3.6 | 0.9 | 4.0 | |
| 8 | 2.5:1 | Addn. of M.A. and APS to $NaH_2PO_2$ | 53.6 | 14.2 | 25.8 | 1.7 | 0.0 | 4.7 | Unreacted M.A. in sample |
| 9 | 2.5:1 | Addn. of APS to M.A. & $NaH_2PO_2$ | 17.6 | 40.5 | 22.0 | 9.0 | 4.9 | 6.0 | |
| 10 | 3.0:1 | Addn. of APS to M.A. & $NaH_2PO_2$ | 15.4 | 40.6 | 20.2 | 10.8 | 5.4 | 7.6 | Unreacted M.A. in sample |
| 11 | 2.0:1 | Addn. of APS and $NaH_2PO_2$ to M.A. | 14.8 | 27.2 | 31.4 | 3.5 | 6.1 | 17.0 | |
| 12 | 2.2/1.0 | Addn. of M.A. and APS to $NaH_2PO_2$ | 10.4 | 6.3 | 77.5 | 1.4 | 0.0 | 4.4 | Used Na maleate, some unreacted acid in sample |
| 13 | 2.0/1.0 | Addn. of Dimethyl maleate & t-butyl peroctoate to $NaH_2PO_2$ | 88.5 | 0.0 | 11.5 | 0.0 | 0.0 | 0.0 | EtOH + $H_2O$ solvent, ester saponified |
| 14 | 1.0/1.0 | Addn. of Dimethyl maleate & t-butyl peroctoate to $NaH_2PO_2$ | 8.1 | 0.0 | 73.8 | 0.0 | 0.0 | 18.1 | EtOH + $H_2O$ solvent, ester saponified |
| 15 | 1.0/1.0 | Addn. of M.A. and APS to $NaH_2PO_2$ | 12.8 | 0.0 | 67.1 | 0.0 | 0.0 | 20.1 | |
| 16 | 2.0/1.0 | Addn. of M.A. and V-50 to $NaH_2PO_2$ | 10.9 | 22.9 | 41.3 | 2.7 | 1.7 | 20.5 | |
| 17 | | Oxidation of Sample N° 7 with $H_2O_2$ | 68.0 | 3.0 | 0.0 | 26.0 | 0.0 | 3.0 | Sample N° 7 oxidized with $H_2O_2$ |

GLOSSARY
M.A. = Maleic acid
APS = Ammonium persulfate
Hypo = sodium hypophosphite monohydrate
2:1 = Monosodium phosphinicobis (succinate)
OLIG = Oligomeric phosphinicosuccinates
1:1 = Monosodium phosphinicosuccinate
V-50 = 2,2'-azobis (2-amidopropane) hydrochloride
PSA = Monosodium phosphonosuccinate
Other Phosphonics = Unknown phosphonic compounds
Resid. = Unreacted sodium hypophosphite and phosphorus acids Several of the compositions set forth in the above table were evaluated as scale inhibitors using the following test method, referred to as the DEAL technique, i.e. The Dynamic Equilibrium Alkalinity Limit ("DEAL").

The apparatus is a recirculating system with a stainless steel heat transfer surface, outfitted with an automatic sampling system. The concentration of the ionic species is increased by evaporative water loss over a period of twenty-four (24) hours. On the basis of the chloride concentration, the cycles of concentration are this precipitation has been inhibited is reported as the second measurement of the inhibitor's performance.

Using the DEAL method described above, the following test results were obtained and are set forth in Table II.

TABLE II

CaCO₃ Scale Inhibition for
Phosphinico- and Phosphonosuccinate Mixtures

| Sample Number | Mole % Oligomer | Precipitation Area[1] | Max CaCO₃ Inhibition[2] (mg/l) |
|---|---|---|---|
| 15 | 0 | 307 | <268 |
| 13 | 0 | 306 | <273 |
| 17 | 3 | 164 | 342 |
| 7 | 14 | 148 | 352 |
| 3 | 32 | 78 | 374 |
| 9 | 40 | 60 | 393 |

[1]In this Table, Precipitation Area means a computation of $CaCO_3$ precipitated during the test (for twenty [20] hours) while concentrating the initial water to two cycles. The lower the value, the more effective is the inhibitor

[2]Max $CACO_3$ inhibition means the maximum calcium carbonate concentration where 95% of potential precipitation has been inhibited. The higher the value, the more effective is the inhibitor.

It is evident from a study of the data in Table II that unless the oligomer is present in the composition, there is poor scale inhibition. As a corollary, as the oligomer content increases, the scale inhibition increases.

In U.S. Pat. No. 4,088,678, there is shown that when 2.2 moles of maleic acid are reacted with one mole of sodium hypophosphite using ammonium persulfate as an initiator, there is supposedly produced the compound, phosphinicobis (succinic acid). The patent further demonstrates that the 2.2 mole reaction product gave the best results as a chelant for calcium carbonate. A study of the data in the patent shows that the products produced from the 2.2 mole reaction do not give uniform results.

After the filing of U.S. Pat. No. 4,088,678, in the United States, a number of foreign counterparts were filed in several countries. The disclosures in the foreign applications were broader than those appearing in U.S. Pat. No. 4,088,678. Illustrative is the disclosure of GB 1,521,440, which was published on Aug. 16, 1978. In the specification, it is stated as a general proposition that the molar ratio of a large number of monolefinic carboxylic acids, which includes maleic acid, to hypophosphite may vary between 1-3 moles. It further states that when bis-substituted phosphinates are desired then the ratio should be between 2-3:1 of acid to phosphite. The patent additionally states that excellent results are obtained when the ratio is 2-2.4:1. This proposal is characterized by the patentees in the following words:

"While excesses may be used, little advantage is obtained therefrom."

In specific support of the proposition the patentees saw no advantage to increasing the molar ratio of maleic acid beyond 2.1 are the following statements appearing in the British patent.

"Most of the preparations of 2:1 adduct were done using 5 to 10% excess maleic acid to drive the reaction to completion; the actual molar ratios were 2.1:1 of 2.2:1. The effect of excess maleic acid was observed in a series of experiments in which the base reaction conditions were used, i.e. 7.5% catalyst added over four hours at 60° C. and then heated three to four hours longer. A slight increase in activity was observed as excess maleic acid was increased from 2-5 to 10% excess although the amount of increase was only slightly more than the experimental error of M value titration. On the basis of these experiments, 5% excess maleic acid would give the same activity as 10% excess and would be slightly less expensive. In these experiments, extending heating time from two hours to three or four hours after catalyst addition gave only slight apparent improvement in M value, which was still within experimental error of the titration."

It is apparent from the teachings of the U.S. and British patents discussed that there was no appreciation that the compositions disclosed to have effectiveness must contain the oligomer. More importantly is the inescapable conclusion that the patents do not suggest or render obvious that improved chelation values or scale prevention could be achieved using molar ratios in excess of 2.2 to produce the compositions described by the patentees.

Having described our invention, we claim:

1. A phosphinate containing composition comprising:

| Ingredients | Mole Percent - Less Than |
|---|---|
| A. Monosodium phosphinicoibis (Succinic Acid) | 22 |
| B. Monosodium phosphinico succinic acid | 26 |
| C. Sodium phophono succinic acid | 12 |
| D. Sodium phosphate | 5 |
| E. Sodium phosphite | 6 |
| F. Sodium hypophosphite, and | 6 |
| G. A phophinico succinic acid oligomer having the structural formula: | |

$$\mathrm{-(CH-CH)_{\mathit{m}}-\underset{\underset{ONa}{\mid}}{\overset{\overset{O}{\|}}{P}}-(CH-CH)_{\mathit{n}}-}$$
$$\mathrm{\ \ \ |\ \ \ \ \ \ |\ \ \ \ \ \ \ \ \ \ \ \ \ \ \ \ \ \ \ \ \ \ \ |\ \ \ \ \ |}$$
$$\mathrm{COOM\ COOM\ \ \ \ \ \ \ \ \ \ \ \ \ COOM\ COOM}$$

wherein the sum of A+B+C+D+E+F is from 60 to 68 mole % and G is from 32 to 40 percent, M is H or Na and m and n are either 0 or a small whole number with the proviso that either m or n is a small whole number and the sum of m plus n is greater than 2.

2. The phosphinate containing composition of claim 1 where the sum of A+B+C+D+E+F is from 60 to 65 mole % and G is about between 35-40 mole percent.

3. The phosphinate containing composition of claim 2 where M is H, Na, and mixtures thereof.

* * * * *